US012746734B2

(12) United States Patent
Unglert et al.

(10) Patent No.: US 12,746,734 B2
(45) Date of Patent: Sep. 29, 2026

(54) MATERIAL WEB WITH LABELS OF DIFFERENT LABEL VARIANTS AND METHOD FOR PRODUCING LABELS OF DIFFERENT LABEL VARIANTS

(71) Applicant: Schreiner Group GmbH & Co. KG, Oberschleissheim (DE)

(72) Inventors: Robert Unglert, Munich (DE); Wolfgang Neft, Falkenstein (DE)

(73) Assignee: Schreiner Group GmbH & Co. KG, Oberschleissheim (DE)

(*) Notice: Subject to any disclaimer, the term of this patent is extended or adjusted under 35 U.S.C. 154(b) by 159 days.

(21) Appl. No.: 18/288,585

(22) PCT Filed: Apr. 27, 2022

(86) PCT No.: PCT/EP2022/061224
§ 371 (c)(1),
(2) Date: Oct. 27, 2023

(87) PCT Pub. No.: WO2022/229267
PCT Pub. Date: Nov. 3, 2022

(65) Prior Publication Data

US 2024/0217197 A1 Jul. 4, 2024

(30) Foreign Application Priority Data

Apr. 29, 2021 (DE) ..................... 10 2021 111 059.9

(51) Int. Cl.
*B31D 1/02* (2006.01)
*B41M 3/00* (2006.01)
(Continued)

(52) U.S. Cl.
CPC ............. *B31D 1/027* (2013.01); *B31D 1/021* (2013.01); *B31D 1/026* (2013.01); *B41M 3/008* (2013.01);
(Continued)

(58) Field of Classification Search
CPC ........ B31D 1/021; B31D 1/026; B31D 1/027; B31D 2201/02; B41M 3/008;
(Continued)

(56) References Cited

U.S. PATENT DOCUMENTS 7,451,698 B2 11/2008 Schneider et al.
2007/0240593 A1 10/2007 Schneider et al.
(Continued)

FOREIGN PATENT DOCUMENTS

CN 101321628 A 12/2008
CN 102548849 A 7/2012
(Continued)

OTHER PUBLICATIONS

International Search Report in PCT/EP2022/061224, mailed Sep. 5, 2022.

(Continued)

*Primary Examiner* — Christopher E Mahoney
*Assistant Examiner* — Marissa Ferguson-Samreth
(74) *Attorney, Agent, or Firm* — Collard & Roe, P.C.

(57) ABSTRACT

A method for producing labels of different label variants includes: performing first and second printing operations to form on a source material web using a digital printing device first and second digital prints associated with first and second label variants, respectively, the two digital prints differing at least with respect to a respective print image; forming on the source material web a machine-readable indicating element detectably different from the first and second label variants and arranged to indicate a change of label variant type; and die cutting to form a material web and processing the web, including controlling and making up the first label variant, detecting the indicating element using a controller, cutting the web in the transition between the label variants and controlling and making up the second label
(Continued)

variant so that separate first and second label webs are formed with the first and second label variants, respectively.

14 Claims, 6 Drawing Sheets

(51) Int. Cl.

| | |
|---|---|
| ***B41M 5/00*** | (2006.01) |
| ***G06T 7/00*** | (2017.01) |
| ***G09F 3/00*** | (2006.01) |
| *G09F 3/02* | (2006.01) |

(52) U.S. Cl.
CPC ........... *B41M 5/0047* (2013.01); *G06T 7/001* (2013.01); *G09F 3/0297* (2013.01); *B31D 2201/02* (2013.01); *G06T 2207/30144* (2013.01); *G09F 2003/0201* (2013.01); *G09F 2003/0202* (2013.01)

(58) Field of Classification Search
CPC .................. B41M 5/0047; G06T 7/001; G06T 2207/30144; G09F 3/0297; G09F 2003/0201; G09F 2003/0202
See application file for complete search history.

(56) References Cited

U.S. PATENT DOCUMENTS

| | | | |
|---|---|---|---|
| 2008/0074453 | A1 | 3/2008 | Furukawa |
| 2011/0061787 | A1 | 3/2011 | Cummins et al. |
| 2011/0120334 | A1 | 5/2011 | Schneider et al. |
| 2014/0295055 | A1 | 10/2014 | Nagahara |
| 2019/0016551 | A1 | 1/2019 | Seay |
| 2021/0086467 | A1 | 3/2021 | Lang et al. |

FOREIGN PATENT DOCUMENTS

| | | | |
|---|---|---|---|
| CN | 104070781 | A | 10/2014 |
| CN | 111163909 | A | 5/2020 |
| CN | 111479755 | A | 7/2020 |
| DE | 695 11 458 | T3 | 4/2007 |
| DE | 10 2018 122 719 | A1 | 3/2020 |
| EP | 0 684 130 | A2 | 11/1995 |
| JP | 2010-149333 | A | 7/2010 |
| WO | 2005/068174 | A1 | 7/2005 |
| WO | 2005/068197 | A1 | 7/2005 |
| WO | 2006/108269 | A1 | 10/2006 |
| WO | 2020/057811 | A1 | 3/2020 |

OTHER PUBLICATIONS

German Search Report dated Jan. 17, 2022 in German Application No. 10 2021 111 059.9, with English translation of the relevant parts.
Office Action Issued in Chinese Patent Application No. 202280031531.X on Sep. 25, 2025 (with English translation).
Second Office Action Issued in Chinese Patent Application No. 202280031531.X on Feb. 14, 2026 (with English translation).

MATERIAL WEB WITH LABELS OF DIFFERENT LABEL VARIANTS AND METHOD FOR PRODUCING LABELS OF DIFFERENT LABEL VARIANTS

CROSS REFERENCE TO RELATED APPLICATIONS

This application is the National Stage of PCT/EP2022/061224 filed on Apr. 27, 2022, which claims priority under 35 U.S.C. § 119 of German Application No. 10 2021 111 059.9 filed on Apr. 29, 2021, the disclosure of which is incorporated by reference. The international application under PCT article 21(2) was not published in English.

BACKGROUND OF THE INVENTION

1. Field of the Invention

The present invention relates to a method for producing labels of different label variants which can be produced in a simple and inexpensive manner. The invention also relates to a material web with labels of different label variants, which can be produced by means of such a method.

2. Description of the Related Art

A label can serve in particular for identification or proof of origin with respect to an object to be identified. For example, labels are used when it is necessary to indicate ingredients of a container. It is always a challenge to provide an efficient and cost-effective manufacturing process for labels.

SUMMARY OF THE INVENTION

It is an objective which underlies the invention to provide a process which enables labels of different label variants to be manufactured simply and inexpensively. It is further an objective underlying the invention to provide a material web with labels of different label variants.

The tasks are solved by a method and a material web having the features of the respective independent patent claims. Advantageous embodiments and further developments of the method and the material web are indicated in the associated dependent patent claims.

According to an aspect of the invention, a method for producing labels of different label variants comprises providing a source material web having one or more label layers. The method further comprises performing a first printing operation and thereby forming a predetermined first digital print on the source material web by means of a digital printing device associated with a first label variant. The method further comprises performing a second printing operation separate from the first printing operation and thereby forming a predetermined second digital print on the source material web by means of the or a further digital printing device, the second digital print being associated with a second label variant. The first and second digital prints are formed to differ with respect to a respective print image. In particular, the first and second printing operations and the forming of the first and second digital prints can be performed without machine standstill with respect to a machine-guided movement of the source material web. The method further comprises forming a machine-readable indicating element on the source material web. The indicating element is formed to be detectably different from the first and second label variants. The indicating element is configured to indicate a grade change of the label variants. The method further comprises performing a die-cutting operation and thereby forming a web of material having labels of the two label variants and the machine-readable indicating element. In addition, the method comprises processing the material web, which comprises inspecting and finishing the first label variant, detecting the indicating element by means of a control device, cutting the material web in a transition region between the label variants, and inspecting and finishing the second label variant, so that a first label web is formed with the first label variant and a separate second label web is formed with the second label variant.

By means of the described process, labels of different label variants can be manufactured in a simple and cost-efficient manner. Thus, an efficient and reliable manufacturing process can be realized for a campaign of several label variants of a printed product which, for example, do not differ in technical parameters but in appearance. The process described represents a combination of digital printing and campaign printing for different label variants which, after processing, are stored on corresponding material webs or label rolls in a single-sort process.

It is possible by means of the process described in particular to enable cost-effective production of different labels and yet avoid undesirable mixing of the labels from different variants. This is made possible by the fact that the process described has a two-part design, according to which, for example, in a first part different label variants are produced together one after the other at low cost and in a second part a control step takes place in which the different variants are also physically separated and form separate material rolls. Such separation of the variants can ultimately be taken to such an extent that only labels of a single variant are present at an operator station in a control system in the final process step, and the machine-readable feature is used to ensure that this consistent separation can also be automated.

The source material web can, for example, have a continuous film layer which is attached to a liner or a silicone paper by means of adhesive. A die-cutting device can then be used to die-cut a contour of the labels and produce the processed material web. However, it is also possible for label production to be carried out in two separate sub-steps. In this case, printing and/or die-cutting that does not change from label variant to label variant can be formed in a first sub-step, such as application of a white basic print, a company logo and/or a color bar. In principle, constant processing steps, such as die-cutting or printing, which remain the same for all label variants, can be carried out in one process step, if necessary, much faster and with a higher quality, such as with regard to ink coverage and/or brilliance to be formed. This can, for example, also be carried out according to conventional processing methods and, with regard to the labels, can be pre-produced in large quantities particularly favorably, for example an entire annual quantity can be pre-produced as pre-product blanks.

A corresponding second sub-step can then be carried out less expensively by the printing/punching steps described above. The second sub-step can, for example, preferably be carried out several times a year in smaller batches in accordance with individual customer orders. Label production can therefore also be broken down into two or more sub-steps and also carried out at different times, with label inspection and physical separation of the label variants always being carried out to form the label rolls.

In particular, forming the imprints as digital prints makes it possible to produce different label variants without machine stops and grade changes, and the time required and production costs can be kept low accordingly. It is therefore not necessary to observe downtimes of the respective machines when changing between the label variants and, in addition, a high quality can be achieved with regard to the avoidance of variant undermixing of the different label variants.

In addition to the digital prints described, the process may also include one or more conventional prints. Such conventional printing may include printing with silicone varnish and/or printing with an adhesive layer or adhesive layer neutralization. Alternatively or additionally, another digital print may be applied. In particular, the printing operations for forming a respective digital print may comprise inkjet printing. In addition, one or more further printing operations may also be performed comprising an application of a varnish and/or a paint.

According to a further embodiment of the method, the processing of the material web is carried out at least in sections by means of a processing device through which the material web is continuously guided. Accordingly, the method comprises guiding the material web through the processing device and checking and making up the first label variant and detecting the indicating element by means of the control device. The control device may be implemented as a scanner or a camera or may comprise such a component. Once the indicating element has been detected, the continuous guidance of the material web through the processing device is stopped in a controlled manner and the inspection and finishing of the first label variant is terminated. Thereupon, all components associated with the first label variant are removed from an area of the processing device and the process is continued by resuming the processing of the remaining material web by the processing device and carrying out an inspection and finishing of the second label variant.

Processing the material web may further comprise cutting the material web in an initial area of the first and/or second label variant and removing a predetermined material web section having a plurality of labels of the first and/or second label variant. A removal of labels enables a replacement of one or more defective labels of the first and/or the second label variant, provided that a defect is detected during the inspection and finishing of the respective label variant.

In accordance with a further embodiment, the method comprises inspecting the labels associated with the first and/or the second label variant by means of a control device that functions, for example, in a camera-based manner. The method further comprises comparing the inspected labels with stored data for labels of the first and/or second label variant by means of a data control device, and controlling a processing of the source material web and/or the material web by means of a control unit in dependence on the comparison, if it is determined that a label associated with the first or the second label variant deviates from the stored data. In this way, faulty labels can be identified and their position on the material web can be stored and retrieved as required. For example, when processing the material web in the processing device, the material web can be automatically stopped at the stored position, thus enabling a label exchange in a target-oriented and time-saving manner.

According to a further embodiment of the method, the processing of the material web can further comprise a recording of image information of the material web by means of a control device in the area of the first and/or the second label variant comprising the first and/or the second digital print. On the basis of a comparison of the recorded image information with stored data for the predetermined first and/or second digital print, a corrective measure can be initiated if it is determined that the recorded image information about the first and/or second digital print deviates beyond a predetermined tolerance range from the stored data for the predetermined first and/or second digital print. This can be the case, for example, if an outer contour of a digital print does not correspond to how it is specified, so that, for example, an error search is initiated and a continued application of the non-tolerable prints is prevented.

The machine-readable indicating element can, for example, be formed in an edge region of the source material web at a lateral distance, relative to a main direction of extension of the material web, from a continuous area of use of the source material web provided for the first and/or the second label variant. Provided that the dimensions of the source material web substantially correspond to those of the processed material web, the edge region also forms a corresponding side strip of the source material web. In particular, the term "source material web" refers to the initial web structure that is processed by means of printing and, if necessary, by means of die cutting and/or cutting to size in order to produce a finished version of the material web with the label variants. The material web thus realizes a processed form of the source material web.

The machine-readable indicating element may further be configured to comprise a first indicating element and a second indicating element that are formed continuously with respect to a main extension direction of the material web. The indicating elements are detectably distinguishable from one another, with the first indicating element being associated with the first label variant and the second indicating element being associated with the second label variant. For example, a first code is printed in a side strip next to a respective row of labels of the first label variant, while a second code is correspondingly printed on the material web next to a respective row of labels of the second label variant. According to a preferred embodiment, the indicating element can therefore be printed separately or also continuously on a side strip of the material web, so that this feature corresponds to the respective variant at all times. When the grade is changed, the indicating element changes accordingly and then corresponds to the next label variant.

The indicating element implements a machine-readable feature and is designed and/or attached to or on the (source) material web in such a way that it cannot be confused with a label of the subsequent variant. In particular, the machine-readable feature may be attached outside a normal area of use provided for the labels. Thus, in particular, the indicating element is not disposed on the labels of the label variants to be formed. In addition, the machine-readable feature or indicating element does not replicate a complete label of the successor variant, so that reliable identifiability can be achieved and confusion can be ruled out. This makes it possible to achieve a particularly high degree of varietal purity of the respective label variant. In particular, the indicating element is designed in such a way that it is not merely a matter of changing the layout to the successor variant and thus the label design of the successor variant does not simply serve as indicating element. Accordingly, the indicating element is in particular unlike a regular successor label.

According to a further embodiment of the method, the machine-readable indicating element is formed in the transition region between the first and second label variants, such that the indicating element is arranged between the first and second digital prints with respect to a main extension direction of the source material web. The machine-readable indicating element may be formed by means of printing on the source material web and may include a barcode, a data matrix code, and/or a printed image that is visibly and/or machine-detectably distinct from the first and second digital prints. Alternatively or additionally, the machine-readable indicating element may be formed to comprise machine-readable processing and/or control information relating to the subsequent label variant, and processing of the subsequent label variant may be performed in dependence on the detected processing and/or control information of the indicating element.

A possible manufacturing process for labels of different label variants according to the described method may, for example, have the following steps: In a manufacturing step, at least one printing process is carried out for manufacturing a campaign without machine stop between the label variants using digital printing for changing the respective print image, wherein in the transition from one to the next label variant, a section of the (starting) material web is executed without a specific digital print image of one of the label variants. Furthermore, at least one machine-readable feature is printed on the material web, which implements the indicating element for indicating a change of label variant. In a further manufacturing step, the finishing and inspection is first processed of the previous variant, which is formed by the first label variant, for example. This is done until the machine-readable feature is detected. Then the line is stopped, the inspection and packaging of the predecessor variant is finished, the machine workstation is cleaned of the predecessor variant and then the processing of the successor variant is started, which is then realized by the second label variant. After completion of the next production step, including the checks and packaging of the two label variants, all variants are again stored completely sorted by type. In addition, three, four or more different label variants can also be produced and separated in a time-saving and cost-effective manner according to the process described.

The manufacturing steps described therefore comprise a first manufacturing step or manufacturing section in which the digital printing processes are carried out, which make it possible to switch the respective print image between label variants during ongoing operation of the system without stopping the machine. The subsequent second production step or production section, in particular for checking and finishing the label variants, takes place, for example, in a further system which is stopped between the label variants in order to separate the different label variants on the same material web. The stopping of the material web in this production step for the purpose of changing variants is ensured by the fact that in the previous first production step, for example in the transition area between the two successive label variants, the machine-readable indicating element is printed on the material web, which is detected in the second production step.

A manufacturing of label webs with different label variants may comprise one or more of the following finishing steps and/or processing steps in one manufacturing process:

- Manufacturing in more than two manufacturing sections, whereby in particular a third manufacturing section can take place between the two previously described manufacturing sections in such a way that a machine stop between the changing label variants can also be omitted here. Typical of this would be additional processing steps that are neutral across variants, such as the application or dispensing of variant-neutral components, such as a laminate or a dispensed hanger element.
- Refinement of inspection processes to the effect that, in the second production step, during inspection and processing of the material web, a piece of the material web with labels is removed in each case at the start of a label variant in order to use it for any necessary replacement of subsequent faulty labels or faulty areas.
- Refined representation of the second production step and the label inspection carried out in the process to ensure that only one label variant is accessible at the machine workstation in each case. This makes it possible to exclude or at least significantly reduce the risk of variant submixing. For this purpose, after detection of the machine-readable indicating element that indicates the change of variant, all samples and accompanying papers of the previous label variant are removed from the machine workstation. This can be done manually and/or automatically. In particular, the material web is designed in such a way that, after the indicating element has appeared and been identified, a sufficiently variant-neutral section of the material web is available so that the material web is not printed with the print image of the successor variant until the workstation has been completely cleaned of the previous variant and the machine process has then been restarted.
- Supplement by additionally establishing a reduced quality check in the first pass or the first production stage comprising the printing process or processes. This enables the correctness of the subsequent variant to be identified without stopping the machine. For this purpose, for example, a label of a variant is peeled off a liner while the material web is running and then checked for correctness. Alternatively or additionally, a photo or image is taken of the running material web, which can be used to identify the correctness of the printed image of the respective current label variant. The liner realizes, for example, a liner film or a silicone paper on which the at least one label layer is arranged.
- The machine-readable feature may also co-encode, as a barcode or data matrix code, information for identifying the following article or label variant. Alternatively or additionally, the indicating element may also comprise an image or partial image of the following label variant and/or comprise at least one article name or article number suitable for unambiguous differentiation, which can be identified by a camera as a control device. In this way, a check can be made as to whether this label is identical in terms of the code to the label that is pending electronically for the subsequent order or is recorded in non-digital form in order papers.
- The indicating element can also be designed in such a way that predetermined control information is coded along with it, which appropriately change certain pre-settings of the processing machine.
- Furthermore, the process and systems capable of carrying it out can be supplemented by a graphics workflow unit (GWU): at the printing device, for example, a camera detects defective labels and stores this information and the respective position of the defect on the material web. In the inspection step, an inspection machine, which is for example comprised by the processing device, stops in a positionally accurate manner according to the defect information from the first production section in order to be able to replace the defective labels. In combination with the machine-readable indicating element, significantly improved security checks are possible by cross-checking the information from the indicating element with an identification number of the follow-up order from a log of the GWU. In this way, the machine-readable feature can be used to automatically trigger a changeover to a new layout and the corresponding loading of the associated error log of the GWU. In this way, a contribution can be made to an even higher level of security against undesirable sub-mixing of different label variants.

In the transition area between the successive label variants, the material web is designed in such a way that there is no risk of undesirable label undermixing or that this risk is kept very low. For example, the material web in the transition area can be blank or at least without layout or text. Alternatively or additionally, no die-cuts may be made in the transition area to generally prevent use of labels from this area.

Preferably, a section length of the transition area of the material web between the two label types is dimensioned to correspond to an infeed length of a processing machine of the second production section. In this way, it can be ensured that no labels of two different types or variants are present within the working area of the processing machine. On an ejection roll after the first production section, which forms an entry roll for the second production section, there are labels of the two different label variants, but an operator thus only ever has access to labels of the first or the second label variant during processing of a label variant within the system.

The described possibilities for carrying out the manufacturing process realize in particular a combination of interruption-free manufacturing using digital printing for stop-free change of layouts with a control procedure for the two label variants. This makes it possible to contribute to ensuring variant or grade purity after the second production stage and to preclude or at least counteract under-mixing of two different label grades during the second production stage. This also makes it possible to maintain a relatively high processing speed in the printing process without interruption, which in particular minimizes the manufacturing costs of this process. With respect to the digital printing device, the machine hourly rate is generally substantially higher than in the control process in a system of the second manufacturing section.

In accordance with a further aspect of the invention, a material web having labels of different label variants has at least one label layer to which a predetermined first digital print and a predetermined second digital print are applied. The two digital prints are configured to be distinguishable with respect to a respective print image, and the first digital print is associated with a first label variant and the second digital print is associated with a second label variant. The material web further comprises a machine-readable indicating element that is detectably formed differently from the first and second label variants on the label layer and is configured to indicate a change of type of the label variants. The common material web is therefore designed in such a way that a first label web with the first label variant and a separate second label web with the second label variant can be formed by processing the material web, which comprises checking and making up the first label variant, detecting the indicating element by means of a control device, cutting the material web in a transition region between the label variants, and checking and making up the second label variant.

The machine-readable indicating element is formed, for example, in the transition region between the first and second label variants, so that the indicating element is arranged between the first and second digital printing with respect to a main extension direction of the material web. Alternatively or additionally, the machine-readable indicating element is formed such that it comprises a first indicating element and a second indicating element that are formed continuously in an edge region of the material web with respect to the main extension direction of the material web. The indicating elements are detectably formed differently from one another and one is assigned to the first label variant and another to the second label variant.

The described material web can be produced in particular by means of one of the previously described methods, so that the described properties and features of the method are also disclosed for the material web and vice versa.

BRIEF DESCRIPTION OF THE DRAWINGS

The material web comprises the first label variant, the adjoining transition region in which, in particular, the indicating element can be arranged as a machine-readable feature, and the adjoining second label variant. The material web thus realizes an intermediate product as a preliminary stage to the end product manufactured in a single sort, which realizes two separate label rolls, one of which has labels of the first label variant and the other of which has labels of the second label variant.

In the following, embodiments of the invention are explained with reference to schematic drawings. They show.

Figure 1:
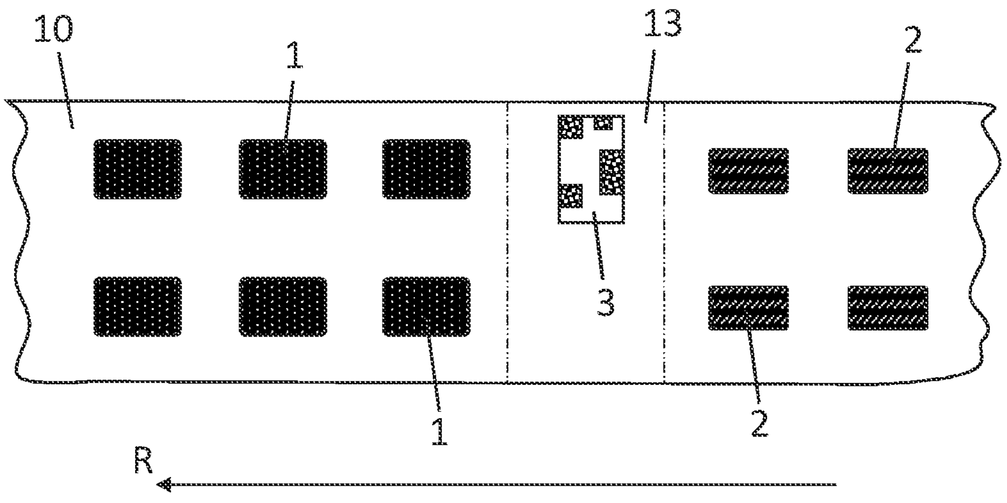
FIGS. 1-4 various embodiments of a material web with labels of different label variants, FIGS. 5-7 embodiments of a system for producing material webs with labels of different label variants, and FIG. 8 a flow chart for a method for producing labels of different label variants.

Elements of the same design and function are marked with the same reference signs across the figures. For the sake of clarity, not all the elements shown in all the figures are identified by the corresponding reference signs, possibly.

DETAILED DESCRIPTION OF THE PREFERRED EMBODIMENTS

FIGS. 1 to 4 schematically show embodiments of a material web 10 with labels of different label variants 1 and 2. The material web 10 comprises at least one label layer with a plurality of labels assigned to the different label variants 1 or 2. The labels of the first label variant 1 have a predetermined first digital print and the labels of the second label variant 2 have a predetermined second digital print, which are applied to the labels by means of a digital printing device 102 (see FIGS. 5-7). The two digital prints are configured to be distinguishable with respect to a respective print image, and the first digital print is associated with the first label variant 1 and the second digital print is associated with the second label variant 2.

The material web 10 further comprises a machine-readable indicating element 3 which is detectably formed differently from the first and the second label variants 1, 2 on the material web 10 and is arranged to indicate a change of type of the label variants 1, 2. The common material web 10 is therefore designed in such a way that by means of processing the material web 10, which comprises checking and making up the first label variant 1, detecting the indicating element 3 by means of a control device 104, 106, cutting the material web 10 in a transition region 13 between the label variants 1, 2 and checking and making up the second label variant 2, a first label web or label roll 11 with the first label variant 1 and a separate second label web or label roll 12 with the second label variant 2 can be formed in a single sort.

According to FIG. 1, the indicating element 3 is arranged in the transition area 13 and is printed, for example, as a data matrix code. Alternatively or additionally, the indicating element 3 may also comprise a barcode, a printed image or a marking symbol. With respect to a main extension direction R of the material web 10, which also corresponds to a winding or unwinding direction with respect to a label roll, the machine-readable indicating element 3 is formed between the first and second label variants 1, 2.

Figure 2:
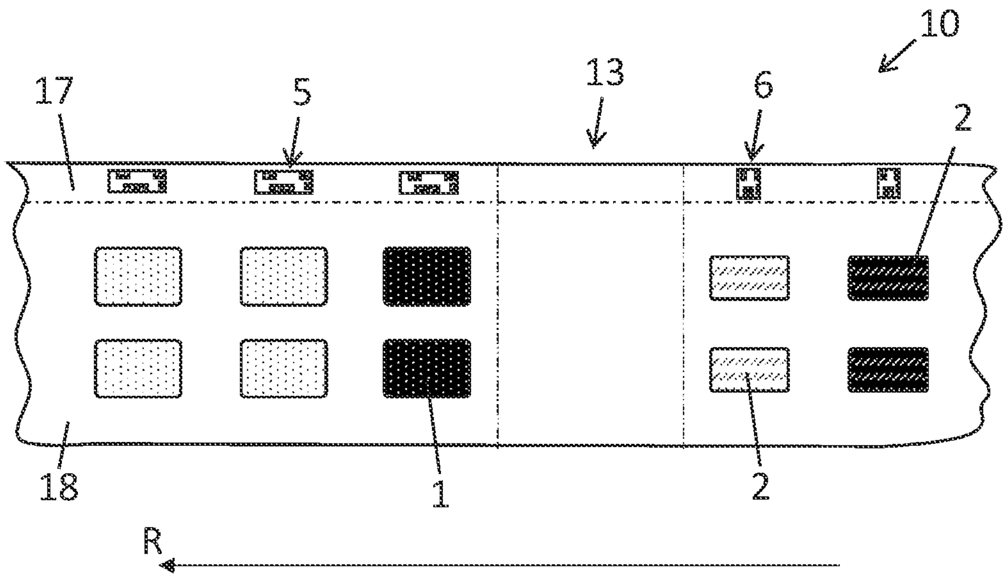
Figure 3:
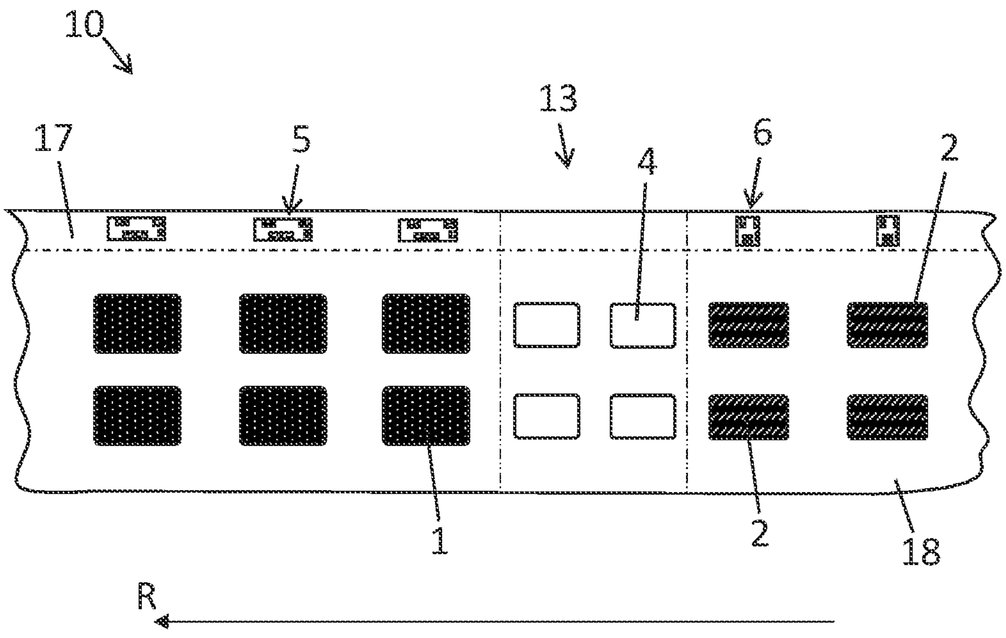

Alternatively or additionally, the machine-readable indicating element 3 is designed in such a way that it comprises a first indicating element 5 and a second indicating element 6, which are formed continuously with respect to the main direction of extension R of the material web 10 and are formed in an edge strip 17 of the material web 10 (see FIG. 2). The edge strip 17 forms a side section of the material web 10, which runs laterally along the main extension direction R to a usage area 18, which is provided for the labels of the first and/or second label variants 1, 2. The indicating elements 5, 6 are detectably differently formed and associated with the first or the second label variant 1, 2. The transition area 13 can be free of an indicating element 3, 5, 6 or other symbols or, as shown in FIG. 3, can have a plurality of blank labels or blank labels 4 which additionally indicate the change between the label variants 1 and 2.

Alternatively, only a sequence of first or second indicating elements 5, 6 may be formed. For example, as shown in FIGS. 2 and 3, a respective row of labels of the first label variant 1 each has the first indicating element 5 associated therewith, with no indicating element being arranged in the transition region 13 and subsequently in the section of the material web 10 which has the second label variant 2. When the first indicating element 5 is read and identified, for example by means of a camera or a scanner, it is detected that the first label variant 1 is present. After detecting the last indicating element 5, no further indicating element would then be detected and it can be automatically concluded that the successor variant is present, which corresponds to the second label variant 2.

Figure 4:
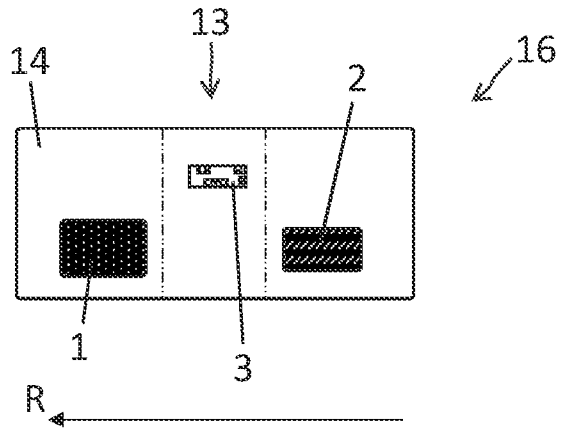

FIG. 4 schematically illustrates a label arrangement 16 as a section of the material web 10, which comprises at least one label of the first label variant 1 and one label of the second label variant 2 as well as at least one machine-readable indicating element 3. This may be formed in the transition region 13 or alternatively may be associated with one of the labels. It can also comprise two indicating elements 5 and 6 or still the indicating element 3 or more, in order to set up a particularly safe and reliable detection of a change of variant of the labels on the material web 10.

Figure 5:
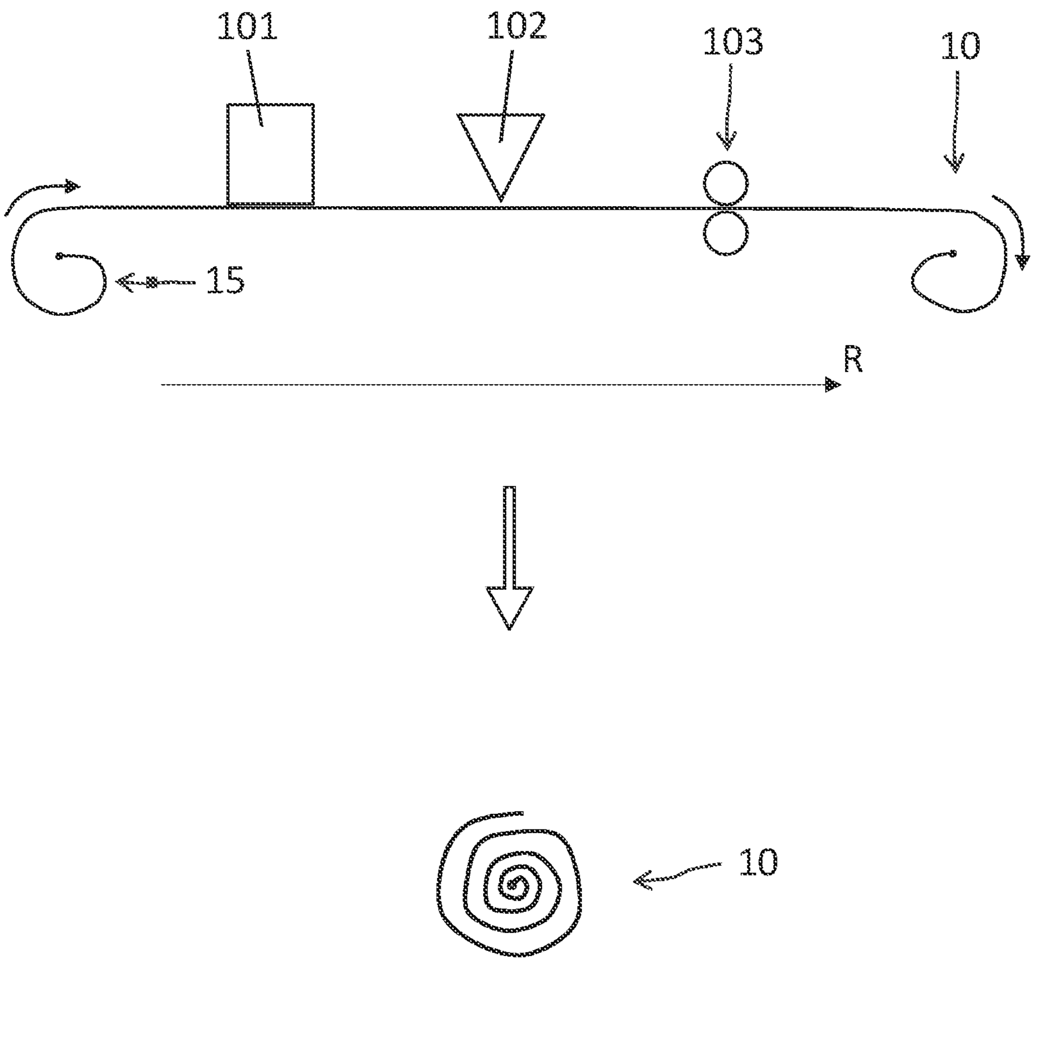
Figure 6:
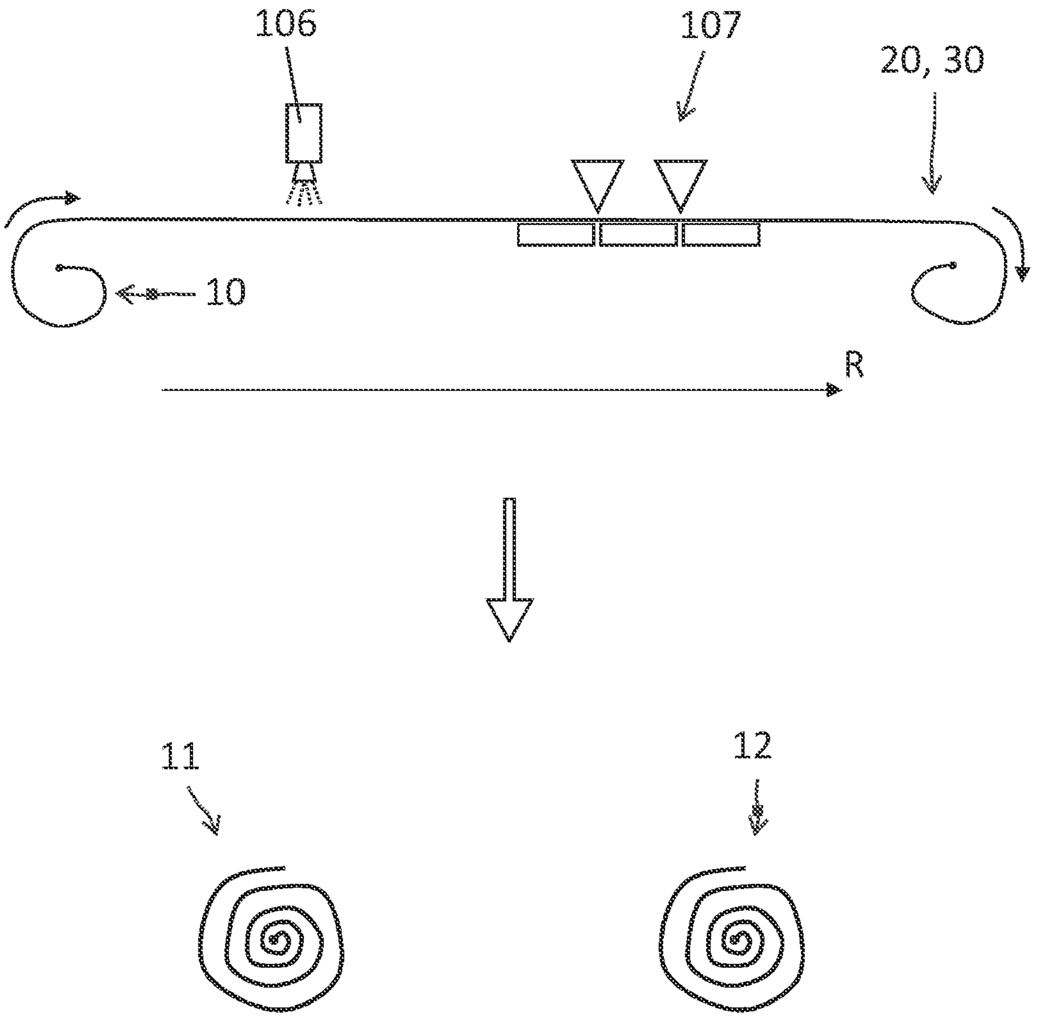
Figure 7:
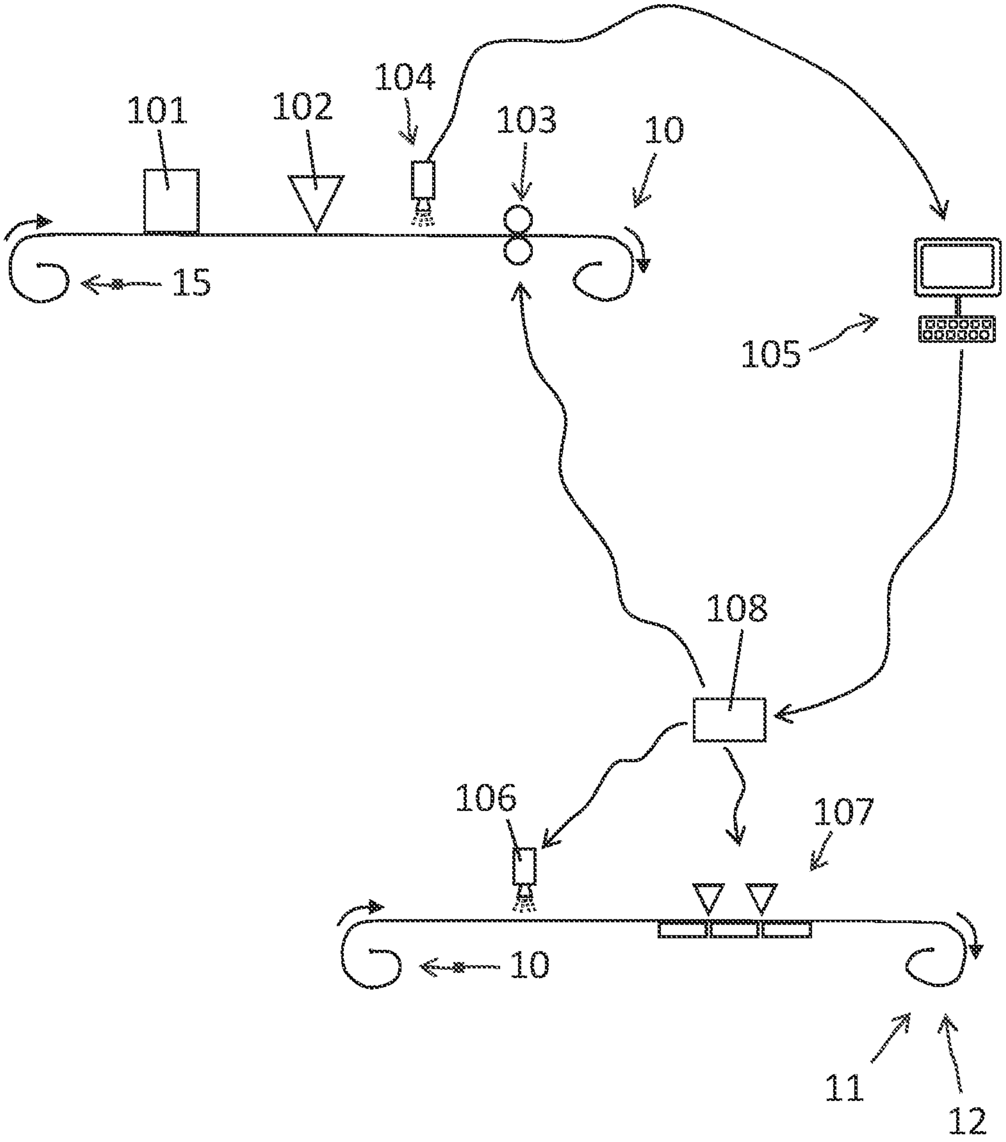
Figure 8:
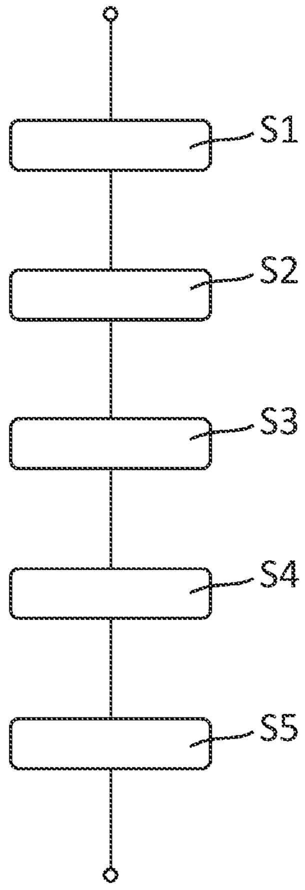

FIGS. 5 to 7 show possible embodiments for a system for producing a design of the material web 10 and separate label rolls 11 and 12 with a plurality of labels of the first or second label variant 1, 2. A corresponding flow chart for a method for producing the material web 10 and the label rolls 11 and 12 with different label variants 1, 2 is illustrated in FIG. 8.

The system according to FIG. 5 comprises a printing device 101, the digital printing device 102 and a die-cutting device 103.

In a step S1, a source material web 15 in the form of a label roll is provided, which has at least one continuous label layer arranged, for example, on a liner or a silicone paper by means of an adhesive. As long as a defined label contour of a label variant is not yet present, the label layer provided can also be referred to as a film layer, from which the label layer with die-cut labels emerges after processing, for example by means of die-cutting. By unwinding the label roll, the source material web 15 is fed into the printing device 101, by means of which, for example, conventional printing can take place. Alternatively or additionally, a laminate or label components for the first and/or the second label variant 1, 2 can be applied in the process.

In a further step S2, digital printing processes are carried out by means of the digital printing device 102, thereby forming the first digital print and the second digital print, which is different therefrom, on the source material web 15. By means of the digital printing device 102, different print images for the different label variants 1, 2 can be applied without requiring a machine change or a machine stop. Thus, the material web 10 can be produced with different label variants 1 and 2 in a time-saving and cost-effective manner.

The formation of a respective indicating element 3, 5 and/or 6 can be carried out by means of the printing device 101 and/or by means of the digital printing device 102 in the step S1 and/or the step S2. Alternatively, in an additional step S3, an indicating element 3, 5 and/or 6 may be formed and/or arranged on the source material web 15.

In a further step S4, a die-cutting operation is then performed, for example, to form the labels of the respective label variants 1, 2. This can be carried out after the printing operation or operations by means of a die-cutting device 103, as illustrated in FIG. 5. In this process, a format die-cutting may be performed to form a predetermined label size and contour of the first and/or second label variants 1, 2. The labels of the two label variants 1 and 2 can be formed with the same shape and dimensions or can be different in shape and/or size. Alternatively, the labels can also be provided already pre-punched on the source material web 15, so that, in contrast to the illustration in FIG. 5, a punching process has already taken place before the printing process or processes. Alternatively or additionally, a functional die-cutting operation can also be carried out, which enables a predetermined function to be provided, such as, for example, the folding out of label sections.

Furthermore, cuts, slits and/or perforations can be made in the source material web 15 by means of the die-cutting device 103, for example to set up easy severing or cutting of sections of the source material web 15 or the material web 10. For example, this may involve severing the edge strip 17 which is no longer required after the material web 10 has been processed. Furthermore, this may concern one or more perforations in the transition area 13 between the label variants 1 and 2, which can be used to form the two separate label rolls 11 and 12. The material web 10 thus represents a processed version of the source material web 15 and includes elements such as those illustrated in FIGS. 1-4, for example.

The material web 10 is then wound up and is then available for further processing as a continuous label roll with at least two different label layouts. Further processing of the material web 10 to form the individual first and second label rolls 11 and 12 is then carried out in a step S5, which is carried out, for example, in further equipment comprising a processing device 107 (see FIG. 6). For example, the first label variant 1 forms the leading label type which is processed first when unwinding the material web 10. The processing of the material web 10 then comprises checking and making up the first label variant 1 until one of the indicating elements 3, 5, 6 is detected by means of a control device 106. Thereupon, a machine stop takes place and the checking and making-up of the first label variant 1 is terminated.

The material web 10 can now be cut in the transition area 13 between the label variants 1, 2. Subsequently, a working area in the processing device 107 is cleaned of all components associated with the first label variant 1. This may include, for example, removing samples, accompanying papers and/or replacement labels of the first label variant from the machine work station. Subsequently, the processing of the successor variant is started, which is designed by the second label variant 2. After completion of the inspection and finishing of the second label variant 2, the two label variants 1 and 2 are stored separately and sorted by type on the associated label rolls 11 and 12.

FIG. 7 schematically shows a further embodiment of a system for processing the source material web 15 and the material web 10. In addition to the components described above, the system comprises a further control device 104, which may be referred to as a first control device with respect to a processing direction. Accordingly, the control device 106 forms a second control device. Furthermore, the system comprises a data control device 105 and a control unit 108 which is signal-technically coupled to the data control device 105 and is adapted to initiate control measures with respect to the processing of the source material web 15 and/or the material web 10. To this end, the control unit 108 may be signal-coupled to one or both of the control devices 104, 106, the punching device 103, and/or the processing device 107, and may sense signals and/or send control signals.

The system thus comprises a graphics workflow unit which detects, for example, by means of the first control device 104 in the form of a camera in the first system, defective labels or labels with defects of the first and/or second label variants 1, 2. This information can be stored together with position information on the material web 10 by means of the data control device 105. In the second system, in which the material web 10 is processed, the processing device 107 can be stopped with positional accuracy by the control unit 108 in accordance with the stored information in order to be able to replace the defective labels. This can be done, in particular, in combination with previously removed web sections which, for example, were specifically removed when forming the material web 10. For example, at the beginning of the first label variant 1 and/or at the end of the second label variant 2, sections of the material web 10 with a plurality of labels of the respective label variant 1, 2 have been severed and are available for any necessary replacement. A severing of such sections may be carried out, for example, by means of the punching device 103 and may be made available for possible use in the working area of the processing device 107.

Furthermore, the control unit 108 may, for example, prevent or disable punching by means of the punching device 103 if, for example, it is determined by means of the first control device 104 that a defective label or insufficient digital printing of the first and/or second label variants 1, 2 has been detected. Thus, for example, defective labels can be prevented from being peelable and used.

The material web 10 comprises the first label variant 1, the adjoining transition region 13, in which the indicating element 3 can be arranged as a machine-readable feature, and the adjoining second label variant 2. The material web 10 thus realizes an intermediate product as a preliminary stage to the end product manufactured in a single sort, which comprises two separate label rolls 11 and 12, of which the first label roll 11 has labels of the first label variant 1 and the second label roll 12 has labels of the second label variant 2.

The described methods for producing designs of the material web 10 and the label rolls 11, 12 enable, in particular due to a continuous digital printing process, a simple and cost-effective production of a series of different label variants 1, 2 on a carrier web or a label roll. After processing the material web 10 with the different label variants 1 and 2, single-sort label rolls 11, 12 are formed with only one label variant 1, 2 each.

LIST OF REFERENCE SIGNS

1 first label
2 second label
3 indicating element
4 blank label
5 first indicating element
6 second indicating element
10 material web
11 first label roll
12 second label roll
13 transition area
14 material web section
15 source material web
16 label arrangement
17 edge strip
18 usage area
101 printing device
102 digital printing device
103 die-cutting device
104 first control device
105 data control device
106 second control device
107 processing device
108 control unit
R main direction of extension of the material web/source material web
S(i) step of a method for producing a functional label

The invention claimed is:

1. A method for producing labels of different label variants, comprising:
- providing a source material web with one or more label layers,
- carrying out a first printing process and thereby forming a predetermined first digital print on the source material web using a digital printing device associated with a first label variant,
- carrying out a second printing process separate from the first printing process and thereby forming a predetermined second digital print on the source material web using the digital printing device associated with a second label variant, wherein the first and the second digital print differ with regard to a respective print image,
- forming a machine-readable indicating element on the source material web, which is detectably formed differently from the first and the second label variants and is arranged to indicate a change of type of the first and the second label variants,
- performing a die-cutting process and thereby forming a material web having a plurality of label variants and the machine-readable indicating element,
- processing the material web, the processing comprising checking and making up the first label variant,
  - detecting the machine-readable indicating element using a control device, cutting the material web in a transition region between the plurality of label variants and a checking and finishing of the second label variant, so that a first label web is formed with the first label variant and a separate second label web is formed with the second label variant, checking a plurality of labels associated with the first and/or the second label variant using the control device, comparing the plurality of labels associated with the first and/or the second label variant checked using the control device with stored data for labels of the first and/or second label variant using a data control device, and controlling processing of the source material web and/or the material web using a control unit in dependence on the comparison, if it is determined that a label associated with the first or the second label variant deviates from the stored data.

2. The method according to claim 1, wherein performing the first and second printing processes and forming the first and second digital prints by means of the digital printing device are performed without standstill with respect to a machine-guided movement of the source material web.

3. The method according to claim 1, further comprising forming the machine-readable indicating element in an edge region of the source material web at a lateral distance, with respect to a main extension direction of the material web, from a continuous use region of the source material web provided for the first and/or the second label variant.

4. The method according to claim 1, further comprising forming a first indicating element and a second indicating element continuously with respect to a main extension direction of the material web, the machine-readable indicating element comprising the first and second indicating elements, the first and second indicating elements differing from one another in a detectable manner and the first indicating element being assigned to the first label variant and the second indicating element being assigned to the second label variant.

5. The method according to claim 1, further comprising forming the machine-readable indicating element in a transition region between the first and the second label variants, so that the machine-readable indicating element is arranged between the first and the second digital print with respect to a main extension direction of the source material web.

6. The method according to claim 1, further comprising forming the machine-readable indicating element by printing on the source material web a barcode, a data matrix code and/or a printed image.

7. The method according to claim 1, further comprising forming the machine-readable indicating element so as to comprise machine-readable processing and/or control information relating to a subsequent label variant, and carrying out processing of the subsequent label variant in dependence on detected processing and/or control information of the machine-readable indicating element.

8. The method according to claim 1, comprising:

applying a further print, a laminate and/or an iron-on element to the source material web and/or the material web, which is respectively associated with the first and/or the second label variant.

9. A material web with labels of different label variants, comprising:

at least one label layer to which a predetermined first digital print and a predetermined second digital print are applied, the first and the second digital print differing with respect to a respective print image and the first digital print being assigned to a first label variant and the second digital print being assigned to a second label variant, and a machine-readable indicating element which is detectably formed differently from the first and the second label variant on the label layer and is set up to indicate a change of type of the first and the second label variants, so that, by processing the common material web, the first label variant can be checked and made up, the machine-readable indicating element can be detected using a control device, the material web can be cut in a transition area between the first and the second label variants and a control and finishing of the second label variant can be carried out, so that a first label web with the first label variant and a separate second label web with the second label variant can be formed, wherein:

a plurality of labels associated with the first and/or the second label variant are checked using the control device, the plurality of labels associated with the first and/or the second label variant checked using the control device are compared with stored data for labels of the first and/or second label variant using a data control device, and processing of the source material web and/or the material web is controlled using a control unit in dependence on the comparison, if it is determined that a label associated with the first or the second label variant deviates from the stored data.

10. The material web according to claim 9, wherein the machine-readable indicating element is formed in the transition region between the first and the second label variant, so that the machine-readable indicating element is arranged between the first and the second digital printing with respect to a main extension direction of the material web.

11. The material web according to claim 9, wherein the machine-readable indicating element comprises a first indicating element and a second indicating element, which are formed continuously in an edge region of the material web with respect to a main extension direction of the material web, the indicating elements being detectably distinguishable from one another and the first indicating element being assigned to the first label variant and the second indicating element being assigned to the second label variant.

12. A method for producing labels of different label variants, comprising:

providing a source material web with one or more label layers, carrying out a first printing process and thereby forming a predetermined first digital print on the source material web using a digital printing device associated with a first label variant, carrying out a second printing process separate from the first printing process and thereby forming a predetermined second digital print on the source material web using the digital printing device associated with a second label variant, wherein the first and the second digital print differ with regard to a respective print image, forming a machine-readable indicating element on the source material web, which is detectably formed differently from the first and the second label variants and is arranged to indicate a change of type of the first and the second label variants, performing a die-cutting process and thereby forming a material web having a plurality of label variants and the machine-readable indicating element, and processing the material web, the processing comprising checking and making up the first label variant, detecting the machine-readable indicating element using a control device, cutting the material web in a transition region between the plurality of label variants and a checking and finishing of the second label variant, so that a first label web is formed with the first label variant and a separate second label web is formed with the second label variant, recording image information of the material web using a control device in an area of the first and/or the second label variant comprising the first and/or the second digital print, comparing the image information recorded using the control device with stored data for the predetermined first and/or second digital print, and initiating a corrective measure as a function of the comparison, insofar as it is determined that the recorded image information about the first and/or second digital print deviates beyond a predetermined tolerance range from the stored data for the predetermined first and/or second digital print.

13. A method for producing labels of different label variants, comprising:

providing a source material web with one or more label layers, carrying out a first printing process and thereby forming a predetermined first digital print on the source material web using a digital printing device associated with a first label variant, carrying out a second printing process separate from the first printing process and thereby forming a predetermined second digital print on the source material web using the digital printing device associated with a second label variant, wherein the first and the second digital print differ with regard to a respective print image, forming a machine-readable indicating element on the source material web, which is detectably formed differently from the first and the second label variants and is arranged to indicate a change of type of the first and the second label variants, performing a die-cutting process and thereby forming a material web having a plurality of label variants and the machine-readable indicating element, and processing the material web, the processing comprising checking and making up the first label variant, detecting the machine-readable indicating element using a control device, cutting the material web in a transition region between the plurality of label variants and a checking and finishing of the second label variant, so that a first label web is formed with the first label variant and a separate second label web is formed with the second label variant, wherein the processing of the material web is carried out, at least in sections, by a processing device through which the material web is continuously guided, the method further comprising:

guiding the material web through the processing device and checking and making up the first label variant, detecting the machine-readable indicating element using the control device, stopping the continuous guiding of the material web by the processing device and finishing the checking and making up of the first label variant, removing components associated with the first label variant from an area of the processing device, and continuing the processing of the remaining material web by the processing device and checking and making up the second label variant.

14. The method according to claim 1, wherein processing the material web further comprises:

cutting the material web in an initial area of the first and/or the second label variant and removing a predetermined material web section with the plurality of labels of the first and/or the second label variant, and replacing a defective label of the first and/or of the second label variant by an associated label of the removed material web section, if it is determined during checking and packaging of the first and/or second label variant that a label has a defect.

* * * * *